UNITED STATES PATENT OFFICE.

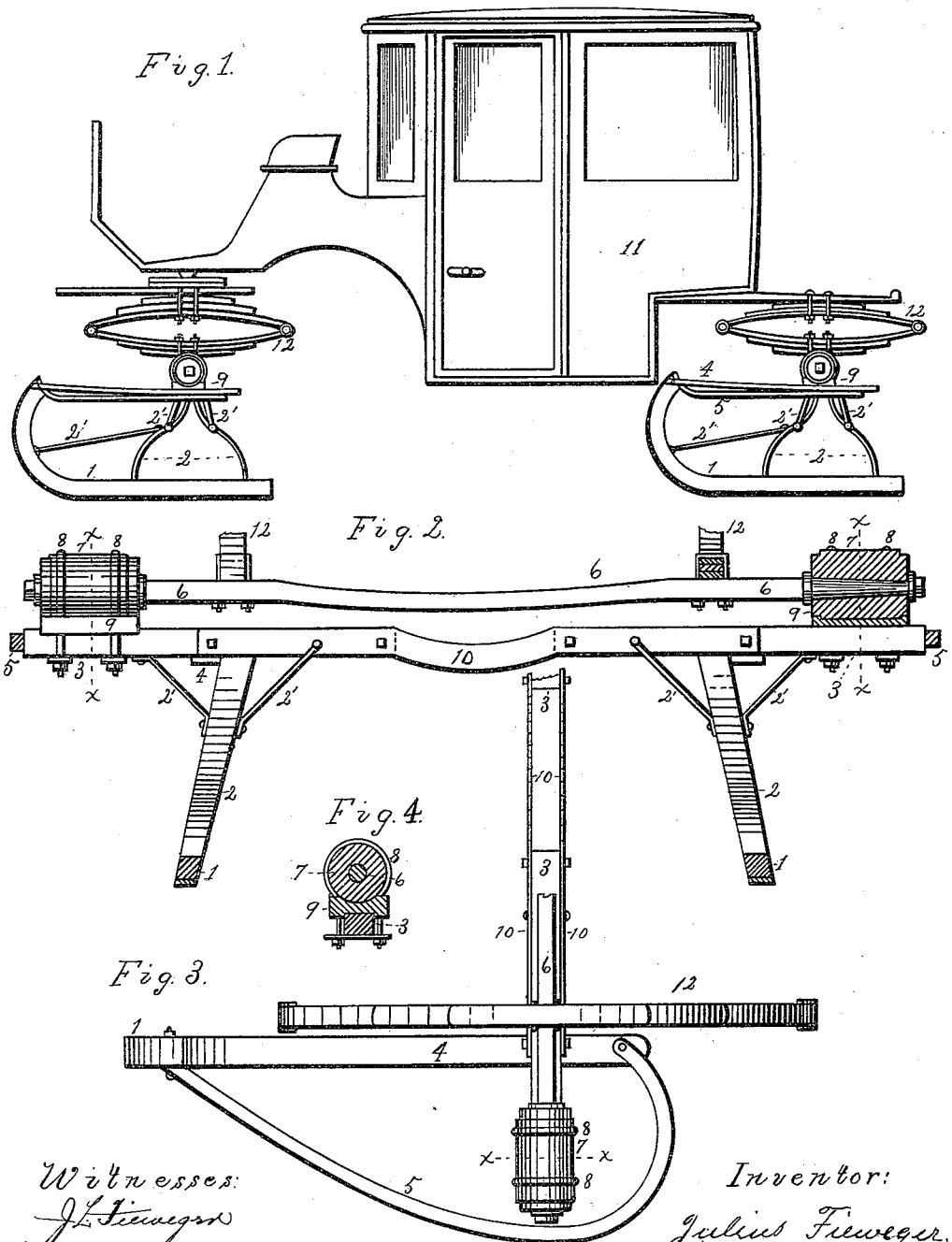

JULIUS FIEWEGER, OF MENASHA, WISCONSIN.

BOB-SLED.

SPECIFICATION forming part of Letters Patent No. 347,786, dated August 24, 1886.

Application filed February 15, 1886. Serial No. 191,912. (No model.)

*To all whom it may concern:*

Be it known that I, JULIUS FIEWEGER, a citizen of the United States, residing at Menasha, in the county of Winnebago and State of Wisconsin, have invented a new and useful Improvement in Bob-Sleighs, of which the following is a specification.

My invention relates to an improvement in that class of bob-sleighs which are designed for use upon carriages in the place of the wheels, which have been removed from the axles, whereby a carriage or other wheeled vehicle can be quickly transformed into a sleigh; and the object of the improvement is to produce a light, strong, and inexpensive sleigh, and one that can be quickly fitted to the running-gear of carriages of various widths, and whose runners can be made to track with others which are in general use in the locality in which they are to be used; also a sleigh which can be readily applied to carriages whose axles are of wood, thimble-skein, iron, or steel, and of various diameters and lengths, and to which their wheels are secured by pins, by nuts on the extremity of the axle, or in any of the various methods in general use, and having also the extremities of the axles protected from injury by passing vehicles or obstructions in their path, both from their front and rear, and, furthermore, has elasticity in its construction, whereby a slight obstruction in the path of one runner is easily passed over without disturbing the smooth running of the other, and which can be quickly disconnected and packed in a small compass for storage or transportation.

In the accompanying drawings, Figure 1 is a side elevation of a pair of bobs having a carriage applied to them. Fig. 2 is a rear elevation upon an enlarged scale, partly in section, of one of the bobs. Fig. 3 is a top view of the left-hand end of Fig. 2; and Fig. 4 is an end view, in section, of the axle-box on the line *x x* of Figs. 2 and 3.

Similar figures of reference indicate like parts in the several views.

Each one of the pair of bobs consists of two bent runners, 1 1, each runner having two bent standards or knees, 2 2, their lower end tenoned into the runner, their upper end into the short section of the beam 3. Iron braces 2' 2' are secured to the knees, by which the bobs are strengthened for withstanding jars, wrenching, &c., incident to their use.

4 and 5 are respectively rave and fender, both of curved form, and secured at their forward extremity to the curved top of the runner and at their rear to each other, the latter being also secured intermediately to the outer extremity of the beam 3, and effectually preventing all liability of collision of the axle extremity with passing vehicles or obstructions.

6 is a carriage-axle, whose extremities are secured in the boxes 7, the boxes being secured to the beam 3 by clip-bolts 8 8. These boxes 7 are formed of such length and diameter of bore as required for the axle to which they are to be applied. Under the boxes 7 are placed blocks or chairs 9, fitted to receive the box and also the top of the beam 3, and through which the clip-bolts 8 8 pass and inclose the beam 3, whereby the longitudinal adjustment of the boxes is provided for, while they are securely held in place by the clamp and nuts on the lower extremity of said clip-bolts.

The two sections of the beam 3 are connected one to the other by two pieces of thin flat spring-steel, 10, bolted firmly to each beam-section. These connecting-pieces are curved downward between the beam-sections, permitting thereby, if required, a like curve in the axle to be placed thereon. The springs 10, while securely holding the runners together, permit an elasticity therein necessary to their free and easy running, and by the use of holes differently located in them permitting any desired variation in the width of the track of the sleigh, and also by disconnecting the beams permitting the bobs to be packed in smaller space for storage or transportation than when the beams are formed of a single piece.

In Fig. 1 is shown a carriage, 11, applied to a pair of bobs for use. They can be used with a single or double team, as desired. Thills or pole can be applied upon a cross-bar, as is usual in other bobs, and the single horse allowed to travel in or between the runner-tracks, as desired.

These bob-sleighs are preferably constructed of what is termed "bent carriage-stock," strengthened with iron braces, as becomes necessary for the use to which it is to be applied, forming thereby a light, strong, and elastic sleigh-bob, having a neat and tasty appearance, and one which is easily applied or removed from a carriage.

The boxes 7 are constructed of wood or metal, preferably the former, and are fitted into the chair 9. Various sizes of boxes can be used and fitted to the same set of chairs, as may be required for different axles.

Desiring to place a carriage upon the bobs, the clip-bolts 8 8 are loosened, the box 7 removed and placed upon the axle in place of the wheel, which has been removed. The carriage is then lifted onto the bobs, the clip-bolts secured upon the box, chair, and sleigh-beam by the nuts upon their extremities.

Where changes from wheels to runners are often required, in order to facilitate making the same, the box and chair may be formed of a single piece and rigidly secured to the beam, a cap being applied over the axle and secured to the box by bolts.

Having thus described my invention, what I claim, and desire to secure by Letters Patent, is—

1. In a sleigh-bob, a beam connecting the runners formed in two sections, said sections being connected one to the other at their inner extremities by one or more plates of spring-steel, substantially as shown and described.

2. In a sleigh-bob to be applied to the running-gear of a carriage, the combination of the runners 1 1 and the knees 2 2 2 2, the raves 4 4, the fenders 5 5, and beam 3, the beam being formed in two sections and connected one to the other at their inner extremities by one or more plates of spring-steel, substantially as described and shown.

3. In a sleigh-bob, the runners 1 1, the knees 2 2 2 2, the raves 4 4, the fenders 5 5, the beam 3, the axle-boxes 7 7, and the chairs 9 9, the boxes and chairs being adjustably secured upon the beam, all combined and operating substantially as set forth.

JULIUS FIEWEGER.

Witnesses:
J. L. FIEWEGER,
HENRY HEWITT, Sr.